United States Patent

Limburg et al.

Patent Number: 5,155,200
Date of Patent: Oct. 13, 1992

[54] POLYARYLAMINE POLYMERS

[75] Inventors: William W. Limburg, Penfield; Dale S. Renfer; John F. Yanus, both of Webster; Jean M. Frechet, Ithaca, all of N.Y.; Sylvie Gauthier, Pointe-Claire, Canada; Dasarao K. Murti, Mississauga, Canada; Giuseppa Baranyi, Mississauga, Canada; Zoran D. Popovic, Mississauga, Canada; Rafik O. Loutfy, Willowdale, Canada

[73] Assignee: Xerox Corporation, Stamford, Conn.

[21] Appl. No.: 512,234

[22] Filed: Apr. 20, 1990

[51] Int. Cl.$^5$ .............................................. C08G 18/32
[52] U.S. Cl. ....................................... 528/67; 528/74; 528/78; 528/85
[58] Field of Search ................... 528/67, 74, 78, 85

[56] References Cited

U.S. PATENT DOCUMENTS

| | | | |
|---|---|---|---|
| 3,844,781 | 10/1974 | Tsuchiya et al. | 96/1.5 |
| 3,890,146 | 6/1975 | Nagashima et al. | 96/1.5 |
| 4,047,948 | 9/1977 | Horgan | 96/1.5 R |
| 4,052,205 | 10/1977 | Stolka et al. | 96/1.5 R |
| 4,265,990 | 5/1981 | Stolka et al. | 430/59 |
| 4,273,846 | 6/1981 | Pai et al. | 430/59 |
| 4,346,158 | 8/1982 | Pai et al. | 430/59 |
| 4,388,392 | 6/1983 | Kato et al. | 430/58 |
| 4,415,641 | 11/1983 | Soto et al. | 430/59 |
| 4,588,666 | 5/1986 | Stolka et al. | 430/59 |
| 4,588,667 | 5/1986 | Jones et al. | 430/73 |
| 4,801,517 | 1/1989 | Frochet et al. | 430/59 |
| 4,806,443 | 2/1989 | Yanus et al. | 430/56 |
| 4,806,444 | 12/1989 | Yanus et al. | 430/56 |
| 4,818,650 | 4/1989 | Limburg et al. | 430/56 |
| 4,937,165 | 6/1990 | Ong et al. | 430/59 |
| 4,983,482 | 1/1991 | Ong et al. | 528/85 |

FOREIGN PATENT DOCUMENTS

1171431  7/1984  Canada.

OTHER PUBLICATIONS

Stolka et al., Photoconductivity and Hole Transport in Polymers of Aromatic Amine-Containing Methacrylates, Journal of Polymer, Science: Polymer Chemistry Edition, vol. 21-969 (1983).

*Primary Examiner*—Maurice J. Welsh
*Assistant Examiner*—Rachel Johnson

[57] ABSTRACT

A polyarylamine polymer represented by formula

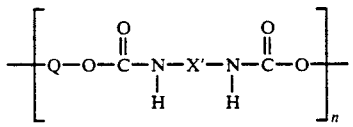

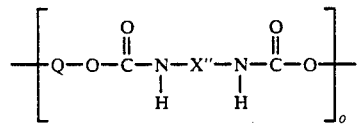

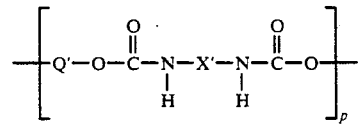

wherein:

n is between about 5 and about 5,000, or 0 if p>0, o is between about 0 and about 5,000, or is 0 if p>0 or n=0, p is between about 2 and about 100, or is 0 if n>0, X' and X" are indendently selected from a group having bifunctional linkages, Q is a divalent group derived from certain hydroxy terminated arylamine reactants, Q' is a divalent group derived from a hydroxy terminated polyarylamine containing the group defined for Q and having a weight average molecular weight between about 1000 and about 80,000 and the weight average molecular weight of the polyarylamine polymer is between about 10,000 and about 1,000,000.

7 Claims, No Drawings

POLYARYLAMINE POLYMERS

BACKGROUND OF THE INVENTION

This invention relates in general to polyarylamine polymers and more specifically, to polymeric tertiary polyarylamines compositions.

In the art of electrophotography an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. These toner particles may be applied to the surface in dry form or dispersed in a liquid carrier medium. The resulting visible toner image can be transferred to a suitable receiving member such as paper. This imaging process may be repeated many times with reusable photoconductive insulating layers.

As more advanced, higher speed electrophotographic copiers, duplicators and printers were developed, degradation of image quality was encountered during cycling. Moreover, complex, highly sophisticated, duplicating and printing systems operating at high speeds have placed stringent requirements including narrow operating limits on photoreceptors. For example, the numerous layers found in many modern photoconductive imaging members must be highly flexible, adhere well to to adjacent layers, and exhibit predictable electrical characteristics within narrow operating limits to provide excellent toner images over many thousands of cycles. There is also a great current need for long service life, flexible photoreceptors in compact imaging machines that employ small diameter support rollers for photoreceptor belt systems compressed into a very confined space. Small diameter support rollers are also highly desirable for simple, reliable copy paper stripping systems which utilize the beam strength of the copy paper to automatically remove copy paper sheets from the surface of a photoreceptor belt after toner image transfer. However, small diameter rollers, e.g. less than about 0.75 inch (19 mm) diameter, raise the threshold of mechanical performance criteria for photoreceptors to such a high level that spontaneous photoreceptor belt material failure becomes a frequent event for flexible belt photoreceptors.

One type of multilayered photoreceptor that has been employed as a belt in electrophotographic imaging systems comprises a substrate, a conductive layer, a charge blocking layer, a charge generating layer, and a charge transport layer. The charge transport layer often comprises an activating small molecule dispersed or dissolved in an polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anti-curl backing layer, an adhesive layer, and an overcoating layer. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with the organic carrier fluid, isoparaffinic hydrocarbons e.g. Isopar ®, commonly employed in liquid developer inks which, in turn, markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]-4,4'-diamine; bis(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4''-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1-phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a $C_{10}$–$C_{14}$ branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure.

The leaching out of the activating small molecule also increases the susceptibility of the transport layer to solvent/stress cracking when the belt is parked over a belt support roller during periods of non-use. Some carrier fluids also promote phase separation of the activating small molecules, such as arylamine compounds and their aforementioned derivatives, in the transport layers, particularly when high concentrations of the arylamine compounds are present in the transport layer binder. Phase separation of activating small molecules also adversely alters the electrical and mechanical properties of a photoreceptor. Although flexing is normally not encountered with rigid, cylindrical, multilayered photoreceptors which utilize charge transport layers containing activating small molecules dispersed or dissolved in a polymeric film forming binder, electrical degradation is similarly encountered during development with liquid developers. Sufficient degradation of these photoreceptors by liquid developers can occur in less than eight hours of use thereby rendering the photoreceptor unsuitable for even low quality xerographic imaging purposes.

Photoreceptors have been developed which comprise charge transfer complexes prepared with polymeric molecules. For example, charge transport complexes formed with polyvinyl carbazole are disclosed in U.S. Pat. Nos. 4,047,948, 4,346,158 and 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation of di-secondary amine with a di-iodo aryl compound are disclosed in European patent publication 34,425, published Aug. 26, 1981 and issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design.

Photoreceptors having charge transport layers containing small molecule arylamine compounds dispersed or dissolved in various resins such as polycarbonates are known in the art. Similarly, photoreceptors utilizing polymeric arylamine containing molecules such as polyvinyl carbazole and polymethacrylates possessing pendant arylamines are also known. Further, condensation polymers of a di-secondary amine with a di-iodo aryl compound are described in the prior art. Moreover, various polymers derived from a reaction of certain monomers with aromatic amines such as N,N'-diphenyl-N,N'-bis(3-hydroxyphenyl)-[1,1'-biphenyl]-4,4'-diamine have recently been described.

Recently photoreceptors having charge transport layers containing charge transporting arylamine polymers have been described in the patent literature. These polymers include the products of a reaction involving a dihydroxy arylamine reactant and are described, for example in U.S. Pat. Nos. 4,806,444, 4,806,443, 4,801,517 and 4,818,650, the entire disclosures of these patents being incorporated herein by reference. Although these polymers form excellent charge transport layers, many other polymeric derivatives of dihydroxy arylamines do not meet the numerous stringent requirements of sophisticated automatic electrophotographic systems. For example, the polymeric reaction products of dihydroxy arylamines and 1,3-diiodopropane form charge transport layers that possess very poor mechanical properties, are soft and non-robust and are of low molecular weight.

INFORMATION DISCLOSURE STATEMENT

U.S. Pat. No. 4,806,443 to Yanus et al, issued Feb. 21, 1989—An electrostatographic imaging member is disclosed in which the imaging member comprises a substrate and an electroconductive layer, the imaging member comprising a polymeric acrylamine compound represented by a formula shown in the abstract.

U.S. Pat. No. 4,806,444 to Yanus et al, issued Feb. 21, 1989—An electrostatographic imaging member is disclosed in which the imaging member comprises a substrate and an electroconductive layer, the imaging member comprising a polymeric arylamine compound represented by a formula shown in the abstract.

U.S. Pat. No. 4,801,517 to Frechet et al, issued Jan. 31, 1989—An electrostatographic imaging member is disclosed in which the imaging member comprises a substrate and at least one electroconductive layer, the imaging member comprising a polymeric amine compound represented by a formula shown in the abstract.

U.S. Pat. No. 4,818,650 to Limburg et al, issued Apr. 4, 1989—An electrostatographic imaging member is disclosed in which the imaging member comprises a substrate and at least one electrophotoconductive layer, the imaging member comprising a polymeric arylamine compound represented by a formula shown in the abstract.

Canadian Patent 1,171,431 corres. to European Patent Application 34,425 to Xerox, published Aug. 26, 1981, issued May 16, 1984. Condensation polymers of a di-secondary amine with a di-iodo aryl compound are described, for example, in working Examples IX and X.

Stolka et al, Photoconductivity and Hole Transport in Polymers of Aromatic Amine-Containing Methacrylates; Journal of Polymer Science: Polymer Chemistry Edition, Vol. 21, 969 (1983)—Hole transport is described in high molecular weight arylamine-substituted polymethacrylates. Synthesis of the monomers, their polymerization, and the general properties of these polymers are also discussed.

U.S. Pat. No. 4,052,205 to Stolka et al, issued Oct. 4, 1977—A photoconductive imaging member is disclosed comprising various active polymers, such as poly-N-vinyl carbazole, in a transport layer, e.g. line 45, column 5 to line 27, column 6. Derivatives of the active polymers may be hydroxy substituted, e.g. column 5, lines 62–65.

U.S. Pat. No. 4,265,990 to Stolka et al, issued May 5, 1981—Transport layers are disclosed comprising small molecule arylamines and a polycarbonate resin binder.

U.S. Pat. No. 4,415,641 to Goto et al, issued Nov. 15, 1983—An electrophotographic light-sensitive element is disclosed comprising a carbazole derivative (see column 3, lines 1–14). $R_2$ can represent a hydroxy group.

U.S. Pat. No. 4,588,666 to Stolka et al, issued May 13, 1986—A hole transporting molecule is disclosed comprising alkoxy derivatives of tetra phenyl biphenyl diamine (see column 3, lines 33–66). $R_1$ and $R_2$ represent alkoxy groups which include methoxy. Resins such as polyvinyl carbazoles, polycarbonate resins, epoxy resins, polyvinyl butyrals, polyhydroxyether resins may be used as a binder for the hole transporting molecule.

U.S. Pat. No. 4,047,948 to A. M. Horgan, issued Sep. 13, 1977—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,346,158 to Pai et al, issued Aug. 24, 1982—A photoreceptor is disclosed comprising layers which may contain polyvinyl carbazole. The use of small molecule arylamine activating compounds in transport layers is also disclosed. The preferred small molecule resin binder is a polycarbonate resin.

U.S. Pat. No. 4,388,392 to Kato et al, issued Jun. 14, 1987, A photoreceptor is disclosed comprising layers which may contain polyvinyl carbazole. The use of an electron-donating polycyclic aromatic hydrocarbon incorporated in an electron-donative polymeric photoconductor in a charge transporting layer is also disclosed.

U.S. Pat. No. 4,273,846 to Pai et al, issued Jun. 16, 1981 An imaging member is disclosed comprising a polycarbonate resin material and an arylamine (see the general formula, column 2, lines 21-34). Poly-N-vinyl carbazole may be employed in the generator layer.

U.S. Pat. No. 3,844,781 to Tsuchiya et al, issued Oct. 29, 1974—Various photoconductive materials are disclosed containing substituents such as hydroxyl, amino and alkoxy groups.

U.S. Pat. No. 3,890,146 to Nagashima et al, issued Jun. 17, 1975—Various photoconductive materials are disclosed containing substituents such as hydroxyl, amino and alkoxy groups.

U.S. Pat. No. 4,588,667 to Jones, issued May 13, 1986—Various overcoated electrophotographic imaging members are disclosed including a multilayered imaging member having a substrate, a titanium metal layer, a siloxane blocking layer, an adhesive layer, a charge generating binder layer, and a charge transport layer. The transport layer may contain from about 25 to about 75 percent by weight of arylamine transport material in a resin binder such as polycarbonate resin.

In pending U.S. application Ser. No. 07/332,650 filed in the name of Ong et al on Apr. 3, 1989—A photoresponsive imaging member is disclosed comprising a photogenerating layer and a hole transporting layer comprising a charge transport polyurethane having a formula shown on page 14 of the application.

Thus, there is a continuing need for multilayered photoreceptors having improved resistance to cracking, crazing, delamination, softening, swelling, crystallization of active compounds, phase separation of active compounds and leaching of active compounds. In addition to the ink compatibility requirements the active compounds in charge transport layers must also have high resistivity for charge retention, high hole mobility for rapid discharge, and mechanical toughness for long life. Further, there is a continuing need for multilayered photoreceptors having improved resistance to cracking, crazing, delamination, crystallization of active compounds, and phase separation of active compounds when used in dry development applications where life is limited by the lack of robustness of the multilayered photoreceptor. There is also a need for polyarylamine polymers that form compositionally stable organic p-n junctions, rugged solar cells and optoelectronic devices.

SUMMARY OF THE INVENTION

It is, therefore, an object of the present invention to provide an improved polyarylamine composition which overcome the above-noted disadvantages.

It is yet another object of the present invention to provide an improved polyarylamine composition which exhibits greater resistance to cracking and crazing induced by liquid ink carrier fluid.

It is yet another object of the present invention to provide an improved polyarylamine composition which exhibits greater resistance to cracking and crazing when mechanically cycled in a belt-type configuration around a narrow diameter roller.

It is a further object of the present invention to provide a polyarylamine composition which exhibits improved resistance to component leaching during liquid development.

It is still another object of the present invention to provide a polyarylamine composition which exhibits improved resistance to component crystallization during liquid development.

It is a further object of the present invention to provide a polyarylamine composition which retains stable electrical properties during cycling.

It is yet another object of the present invention to provide an improved polyarylamine composition which resists abrasion and wear when exposed to blade cleaning devices and dry xerographic developers.

It is a further object of the present invention to provide an improved polyarylamine composition which exhibits resistance to softening and swelling when exposed to liquid ink carrier fluid.

It is still another object of the present invention to provide a polyarylamine composition which possesses an appropriately high glass transition to function in the warm environment of a photoelectristatic product.

It is still another object of the present invention to have the appropriate polymer melt viscosity to be fabricated by laminated film techniques.

The foregoing objects and others are accomplished in accordance with this invention by providing a polyarylamine polymer represented by formula I:

wherein:
n is between about 5 and about 5,000, or 0 if $p>0$,
o is between about 0 and about 5,000, or is 0 if $p>0$ or $n=0$,
p is between about 2 and about 100, or is 0 if $n>0$,
X' and X" are independently selected from a group having bifunctional linkages,

FORMULA I

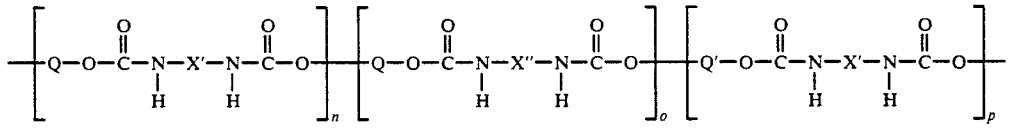

Q is a divalent group derived from a hydroxy terminated arylamine reactant containing the group:

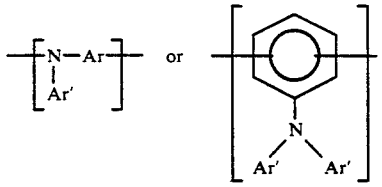

Q' is a divalent group derived from a hydroxy terminated polyarylamine containing the group defined for Q and having a weight average molecular weight between about 1000 and about 80,000, wherein:
Ar is selected from the group consisting of:

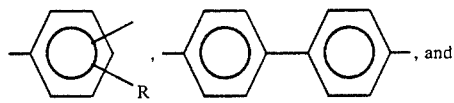

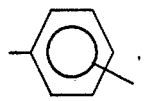

Ar' is selected from the group consisting of:
R is selected from the group consisting of —CH$_3$, —C$_2$H$_5$, —C$_3$H$_7$, and —C$_4$H$_9$,

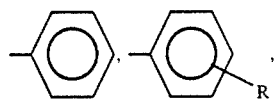

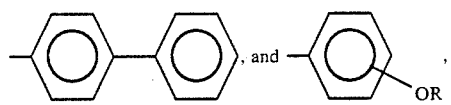

and the weight average molecular weight of the polyarylamine polymer is between about 10,000 and about 1,000,000.

More preferably, the polyarylamine polymer is represented by the formula:

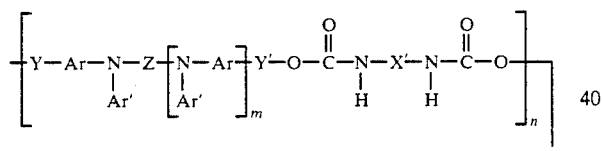

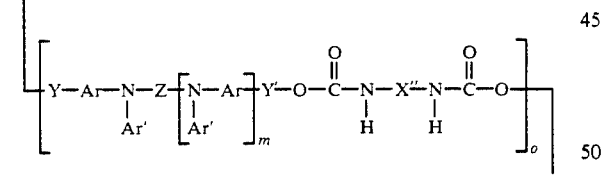

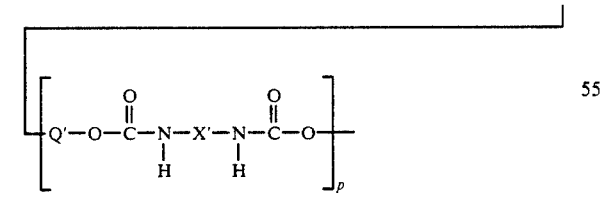

wherein:
m is 0 or 1,
n is between about 5 and about 5,000, or is 0 if p>0,
o is between about 0 and about 5,000, or is 0 if p>0 or n=0,
p if between about 2 and about 100, or is 0 if n>0,
Z is selected from the group consisting of:

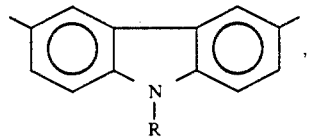

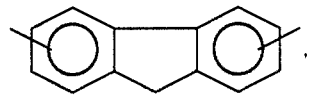

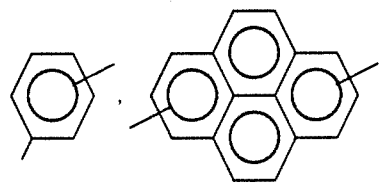

and

—Ar—(X)$_r$—Ar— r is 0 or 1,
Ar is selected from the group consisting of:

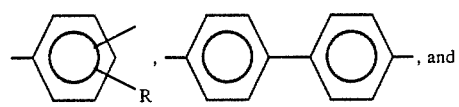

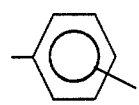

R is selected from the group consisting of —CH$_3$, —C$_2$H$_5$, —C$_3$H$_7$, and —C$_4$H$_9$,
Ar' is selected from the group consisting of:

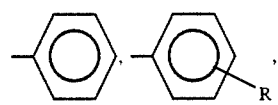

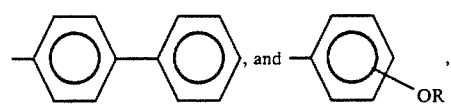

X is selected from the group consisting of:

—CH$_2$—, —C(CH$_3$)$_2$—, —O—, —S—,

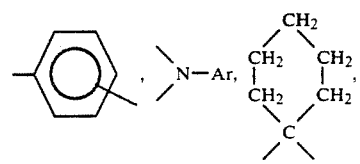

-continued

 , and 

s is 0, 1 or 2,

X' and X" are independently selected from a group having bifunctional linkages, and Y and Y' are independently selected from a group represented by the formula:

—CH$_2$)$_t$ t is 0, 1, 2, 3, or 4

Q' is represented by the formula:

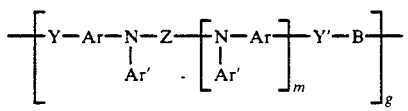

wherein:

Ar, Ar', Z, Y, Y', and m, are as defined previously, and B represents a bifunctional linkage (typical examples of which include:

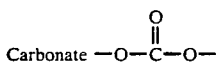

and g is between about 2 and about 350 such that the weight average molecular weight of Q' is between about 1000 and about 80,000, and the weight average molecular weight of the polyarylamine polymer, represented by FORMULA I, is between about 20,000 and about 500,000.

The polymeric arylamine compound of this invention may be utilized in an electrophotographic imaging member comprising a charge generation layer and a hole transport layer, at least the charge generation layer or charge transport layer comprising the above described polymeric arylamine compound of this invention. The polymeric arylamine compound of this invention may also be used for compositionally stable organic p-n junctions, rugged solar cells and optoelectronic devices.

An electrophotographic imaging member containing the arylamine containing polymer of this invention may be employed in any suitable electrophotographic imaging process.

Generally, the polymeric arylamine compounds of this invention may be prepared by reacting a dihydroxy arylamine compound with a co-reactant diisocyanate compound represented by the formula:

O=C=N—X'—N=C=O wherein X' is selected from the group consisting of bifunctional linkages such as alkylene, arylene, substituted alkylene, substituted arylene, ether and polyether segments. Generally, the ether, polyether, alkylene and substituted alkylene bifunctional linkages contain from 1 to 25 carbon atoms. Optionally, an additional diisocyanate compound may be included in the reaction, the compound being represented by the formula:

O=C=N—X"—N=C=O wherein X" is selected from the group consisting of bifunctional linkages such as alkylene, arylene, substituted alkylene, substituted arylene, ether and polyether segments.

Illustrative examples of substituted or unsubstituted alkylene groups include those containing from about 1 to about 25 carbon atoms, and preferably from 1 to about 10 carbon atoms, such as methylene, dimethylene, trimethylene, tetramethylene, 2,2-dimethyltrimethylene, pentamethylene, hexamethylene, heptamethylene, and the like. Illustrative examples of substituted or unsubstituted arylene linkages include the following:

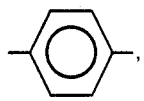

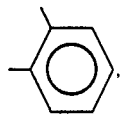

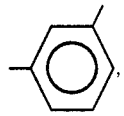

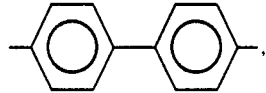

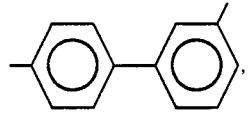

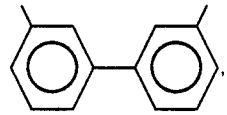

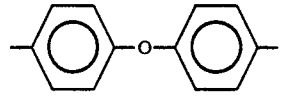

and

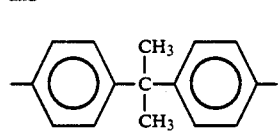

Examples of ether and polyether segments include those containing from about 2 to about 25 carbon atoms, such as —CH$_2$OCH$_2$—, —CH$_2$CH$_2$—OCH$_2$CH$_2$—, —CH$_2$CH$_2$—OCH$_2$—CH$_2$CH$_2$CH$_2$OCH$_2$CH$_2$—, —CH$_2$CH$_2$—(OCH$_2$CH$_2$)$_2$—, —CH$_2$CH$_2$CH(CH$_3$)OCH$_2$CH$_2$—, and the like. Examples of alkyl substituents include those with from 1 to about 25 carbon atoms, such as methyl, ethyl, propyl, isopropyl, butyl, isobutyl, pentyl, 2-methylpentyl, hexyl, octyl, nonyl, decyl, and the like, with methyl, ethyl, propyl, and butyl being preferred. Aryl substituents include those with from 6 carbon atoms to about 24 carbon atoms, such as phenyl, tolyl, ethylphenyl, and naphthyl. The aryl groups can be substituted with alkoxy, hydroxy, halo, cyano, alkoxyalkyl, and the like.

Typical compounds represented by the above formula for the diisocyanate compound include:

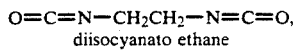
diisocyanato ethane

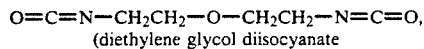
(diethylene glycol diisocyanate

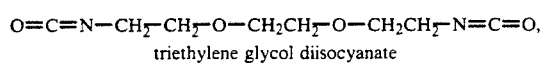
triethylene glycol diisocyanate

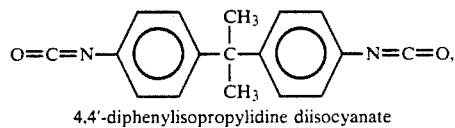
4,4'-diphenylisopropylidine diisocyanate

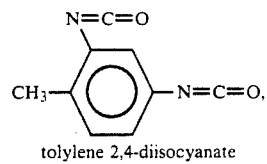
tolylene 2,4-diisocyanate

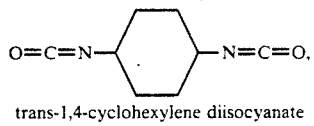
trans-1,4-cyclohexylene diisocyanate

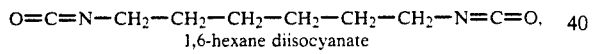
1,6-hexane diisocyanate

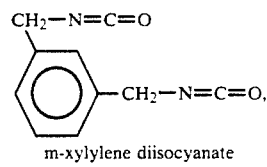
m-xylylene diisocyanate

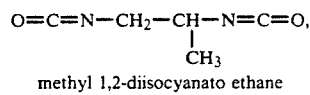
methyl 1,2-diisocyanato ethane

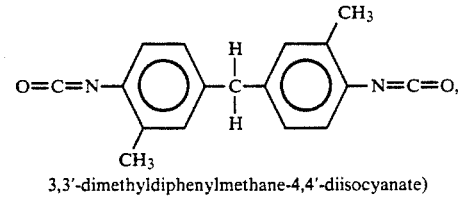
3,3'-dimethyldiphenylmethane-4,4'-diisocyanate)

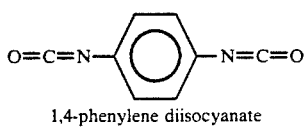
1,4-phenylene diisocyanate and

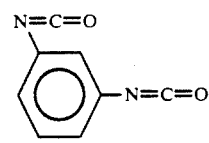
1,3-phenylene diisocyanate

In one embodiment, polymeric arylamine compounds of this invention may be prepared by reacting the diisocyanate compound with a dihydroxy arylamine compound represented by the formula:

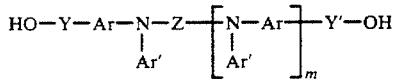

wherein m, Ar, Ar', Z, Y and Y' are as defined above.

Compounds represented by the above hydroxy arylamine formula may be prepared by hydrolyzing an alkoxy arylamine. A typical process for preparing alkoxy arylamines is disclosed in Example I of U.S. Pat. No. 4,588,666 to Stolka et al, the entire disclosure of this patent being incorporated herein by reference. Typical compounds represented by the above formula for hydroxy arylamine compounds include:

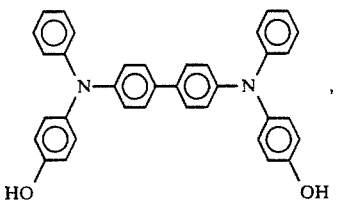

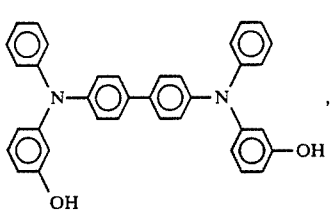

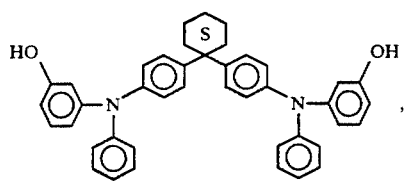

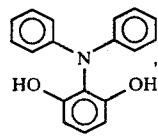

-continued

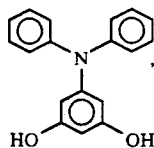

Compounds represented by the above hydroxy arylamine formula where t is 0, 1, 2, 3 or 4 may be prepared by reacting an arylamine compound having the formula:

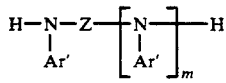

wherein: Z and Ar' are as defined above and m is 0 or 1. Typical compounds represented by this formula include N,N'-diphenylbenzidine, N,N'-diphenyl-p-terphenyl diamine, N,N'-diphenyl-p,p'-diaminodiphenylether, N,N'-diphenyl-p,p'-cyclohexylidene diphenyldiamine, N,N'-diphenyl-p,p'-isopropylidene diphenyldiamine, N,N'-diphenyl-p,p'-methylidene diphenyldiamine, N,N'-diphenyl-p-phenylenediamine, N,N'-diphenyl-m-phenylenediamine, and the like. This arylamine compound is reacted with an iodobenzene compound such as m-bromoiodobenzene, m-chloroiodobezene, p-chloroiodobenzene, p-bromoiodobenzene, and the like to form an intermediate product represented by the formula:

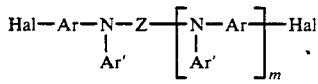

wherein: Z, Ar and Ar' are as defined above, Hal is bromine, chlorine or iodine and m is 0 or 1. The bromine atoms in this intermediate product are thereafter are replaced by lithium. The resulting dilithio arylamine compound is reacted with ethylene oxide, formaldehyde, oxatane, or tetrahydrofuran. This reaction is worked up in the presence of an aqueous acid to form a hydroxy alkylene arylamine precursor represented by the formula:

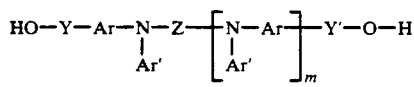

wherein: Z, Ar, Ar', Y, Y' and m are as defined above. This hydroxy alkylene arylamine precursor is then reacted with the co-reactant diisocyanate compound to form a polymeric arylamine of this invention.

The foregoing reactions are more specifically illustrated by the following reactions:

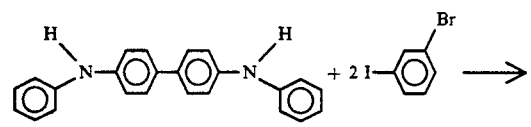

-continued

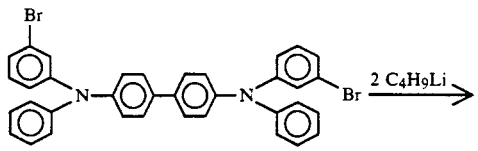

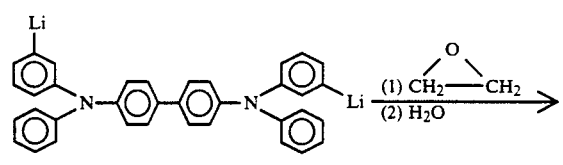

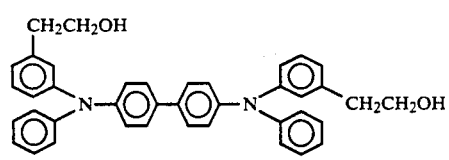

wherein m is 0 or 1. A typical process for preparing a hydroxy alkylene arylamine is disclosed in Examples II and III of U.S. Pat. No. 4,801,517, the entire disclosure of this patent being incorporated herein by reference.

Any suitable solvent may be employed to dissolve the reactants. Typical solvents include tetrahydrofuran, toluene, and the like. Satisfactory yields are achieved with reaction temperatures between about 0° C. and about 100° C. The reaction temperature selected depends to some extent on the specific reactants utilized and is limited by the temperature at which a cross linking side reaction may take place. The reaction temperature may be maintained by any suitable technique such as heating mantles, radiant heat lamps, oil baths, and the like.

The reaction time depends upon the reaction temperatures, the reactants used and whether a catalyst, such as DABCO (diazabicyclooctane), dibutyltin laurylate and the like, is used. Satisfactory results have been achieved with reaction times between about 20 minutes to about 24 hours at elevated temperatures. For practical purposes, sufficient degree of polymerization is achieved by the time the reaction product layer is viscous.

One may readily determine whether sufficient reaction product has been formed by monitoring the increase in solution viscosity. Typical polymeric arylamine compounds of this invention include, for example:

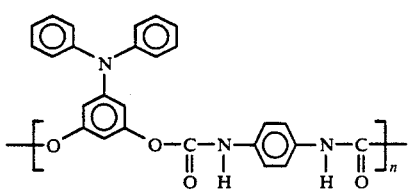

-continued

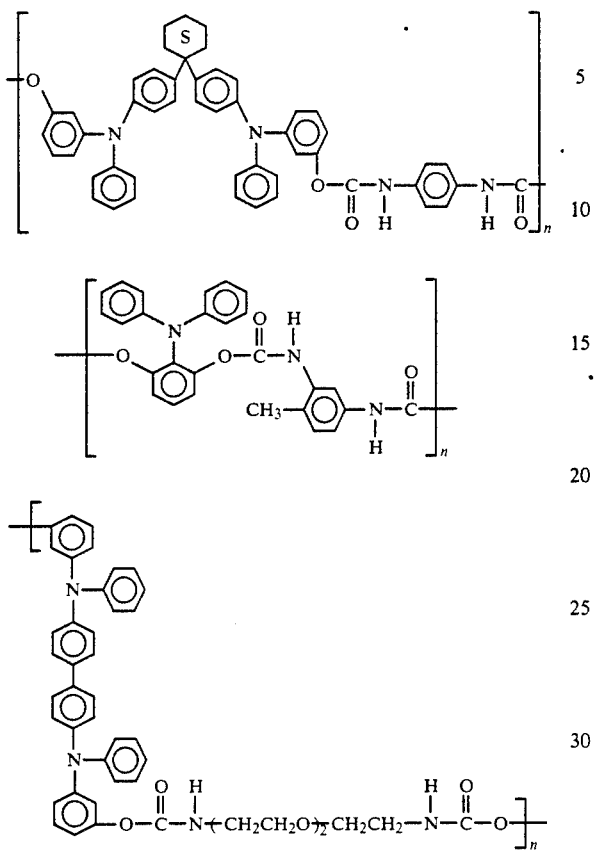

The "n" in the first appearing formula (FORMULA I) herein is defined as between about 5 and about 5,000. For the final polymers, "n" is defined as representing a number sufficient to achieve a weight average molecular weight of between about 20,000 and about 500,000 as represented in FORMULA I.

Alternatively, polymers useful in electrophotography can be prepared by the reaction of diisocyanates (described above) with arylamine polymers of low molecular weight which are hydroxy group terminated. The resulting new polymer thus produced possesses substantially higher molecular weight and those physical properties which are molecular weight dependent are substantially improved. A hydroxy-terminated polyarylamine is defined herein as a polymer formed from the co-reaction of dihydroxy-arylamine and a suitable difunctional compound. Typical difunctional compounds include phosgene, ethyleneglycol bischloroformate, diethyleneglycol bis-chloroformate, triethyleneglycol bischloroformate, succinyl chloride, sebacoyl chloride, dodecyl chloride, and the like. The phosgene and bis-chloroformate difunctional compounds, by their chemical nature, will always form hydroxy-terminated polymers when worked up under aqueous conditions. Those polyarylamines generated using a diacid chloride can be rendered hydroxy-terminated by adding excess dihydroxyarylamine to the polymerization mixture in the latter phases of the polymerization process. Generally, the hydroxy-terminated polyarylamine materials that may be reacted with diisocyanates can be represented by the generic formula:

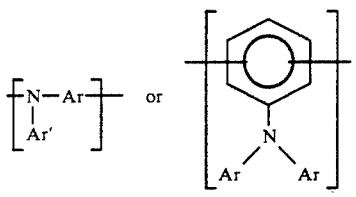

wherein:
Q' is a divalent group derived from a dihydroxy terminated polyarylamine material containing the following group:

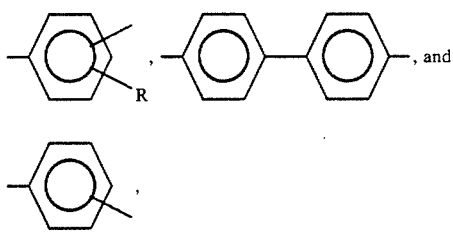

wherein:
Ar is selected from the group consisting of:

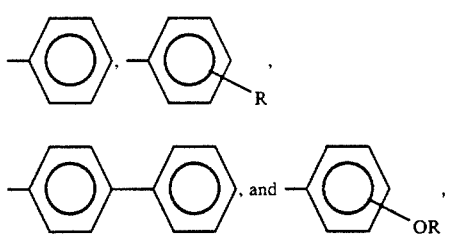

R is selected from the group consisting of —CH$_3$, —C$_2$H$_5$, —C$_3$H$_7$, and —C$_4$H$_9$,
Ar' is selected from the group consisting of:

Preferably, these hydroxy-terminated polyarylamine materials have a low weight average molecular weight between about 1,000 and about 80,000.

In a specific illustrative example, a hydroxyl group terminated, arylamine containing polycarbonate, having a molecular weight of about 5,000 was reacted with 1,6-diisocyanatohexane to yield a polymer having a weight average molecular weight of about 50,000. Compared to the starting hydroxyl group terminated, arylamine containing polycarbonate, the resulting higher molecular weight polymer exhibited greatly improved film forming properties. Additionally, any other suitable hydroxyterminated polyaryl amine of low molecular weight can be joined with suitable diisocyanates to form higher molecular weight materials. Generally, hydroxy-terminated polyaryl amines of low molecular weight lack the useful properties of higher molecular weight polymers. Typically, higher molecular weight polymers also exhibit greater strength, higher glass transition temperatures and higher melting temperatures. Thus, for example, polyethylene of a molecular weight of 1000 to 5000 is a waxy solid and acquires the useful mechanical properties characteristic of a high polymer only above a molecular weight of 10,000.
Typical hydroxy-terminated polyarylamines of low molecular weight include, for example:
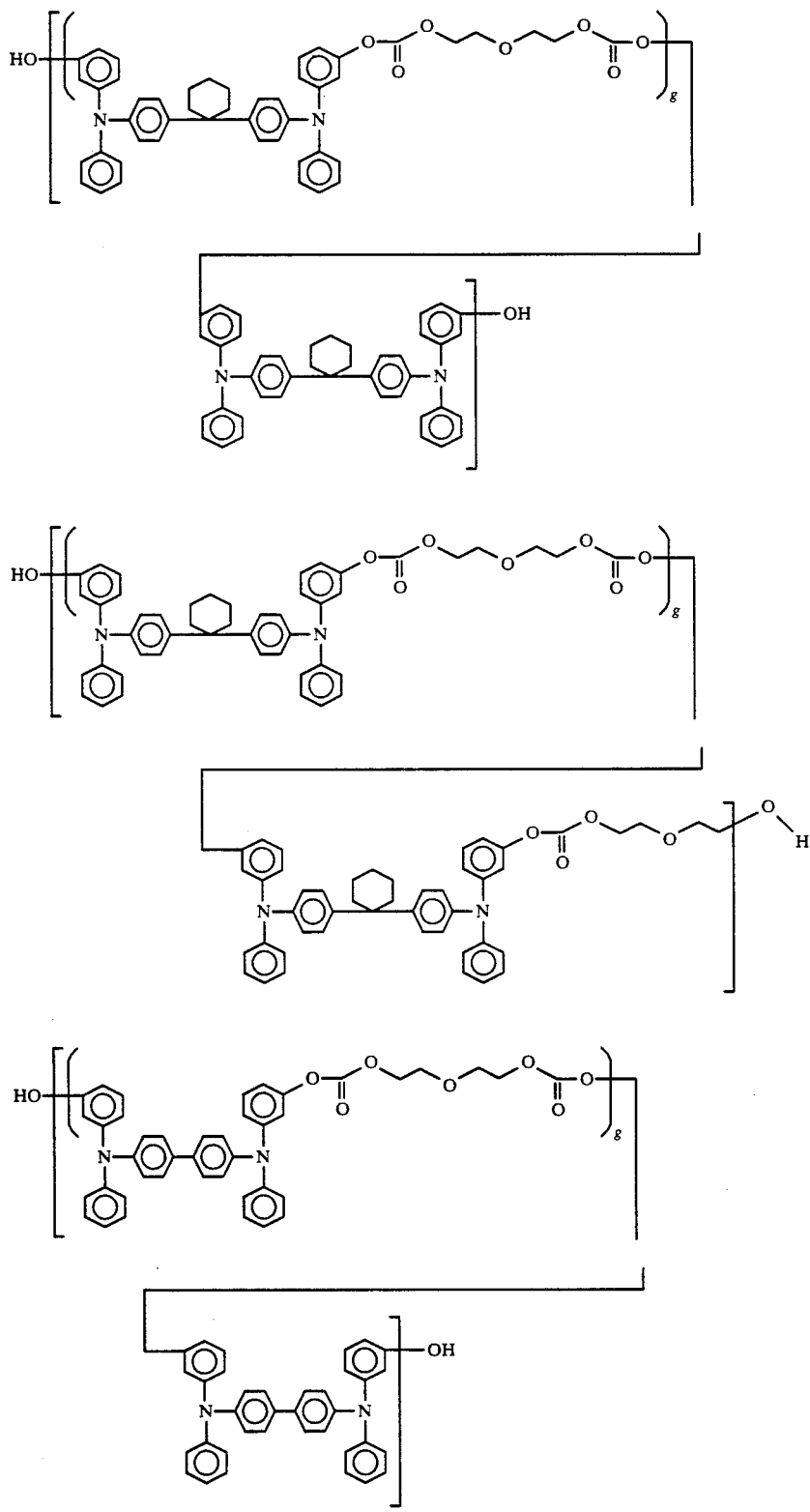

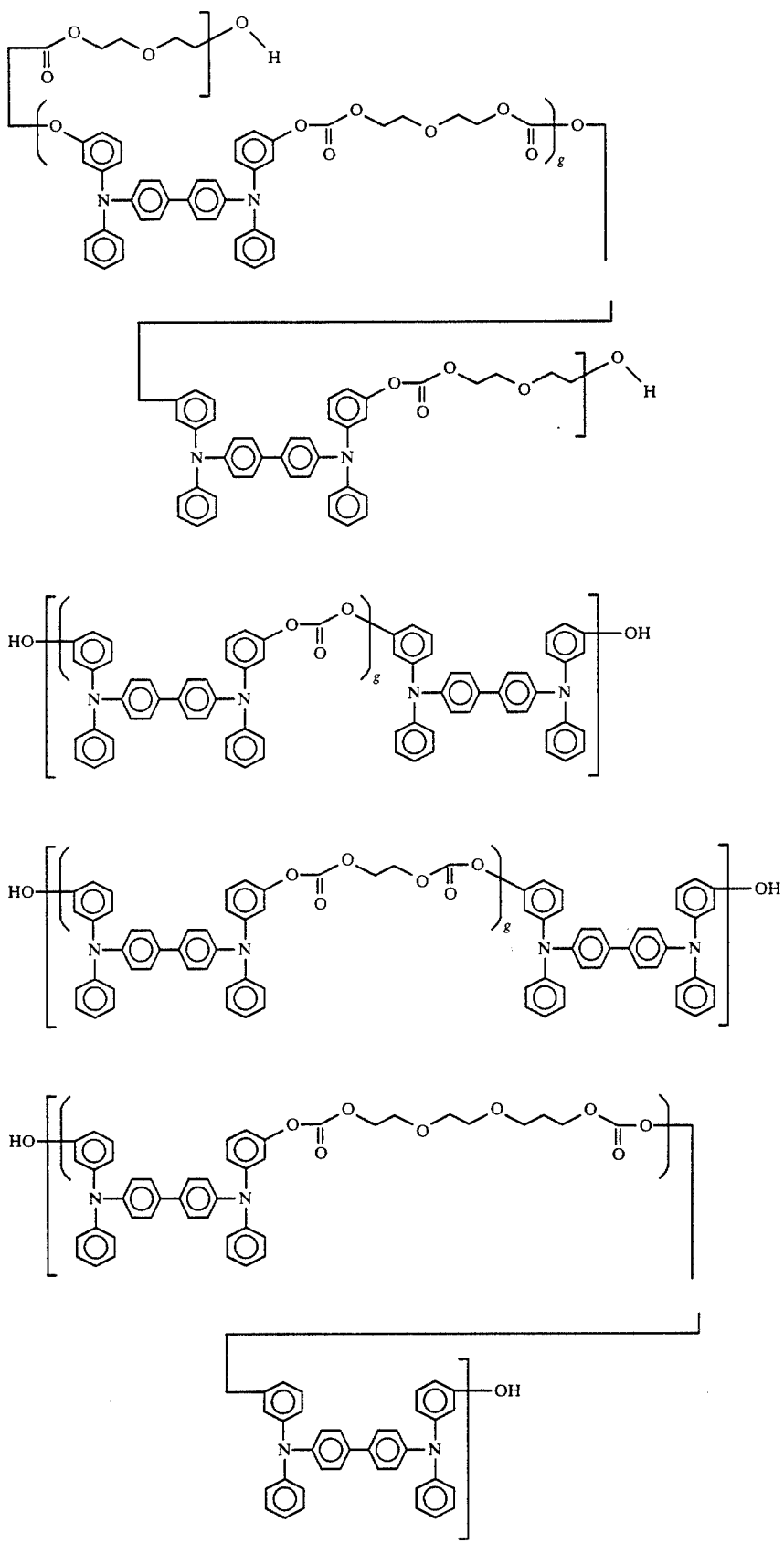

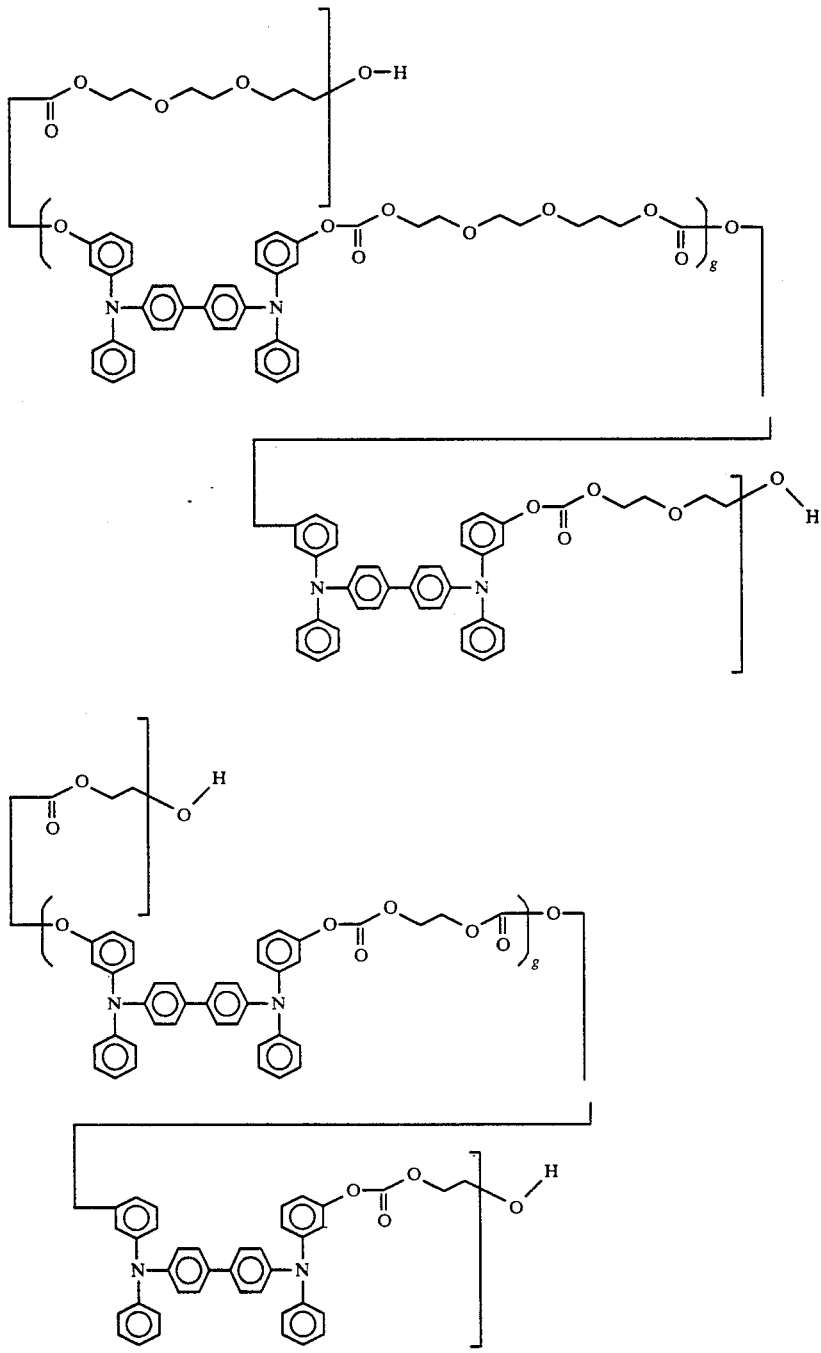
Preferred polymeric arylamines of this invention have a molecular weight from about 10,000 to about 1,000,000, more preferably from about 20,000 to about 500,000.
The following is an illustrative reaction between a specific diisocyanate compound and a specific dihydroxy arylamine compound:
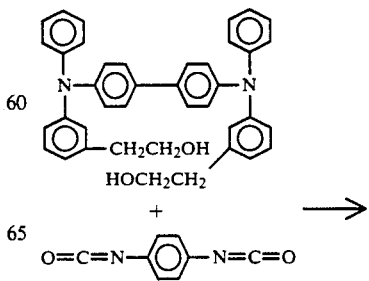

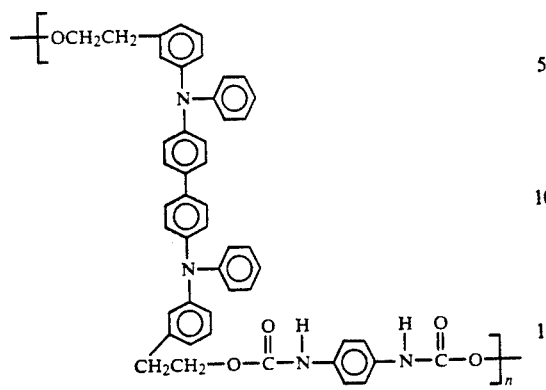

The following is still another illustrative reaction between another specific diisocyanate compound and a specific dihydroxy arylamine compound:

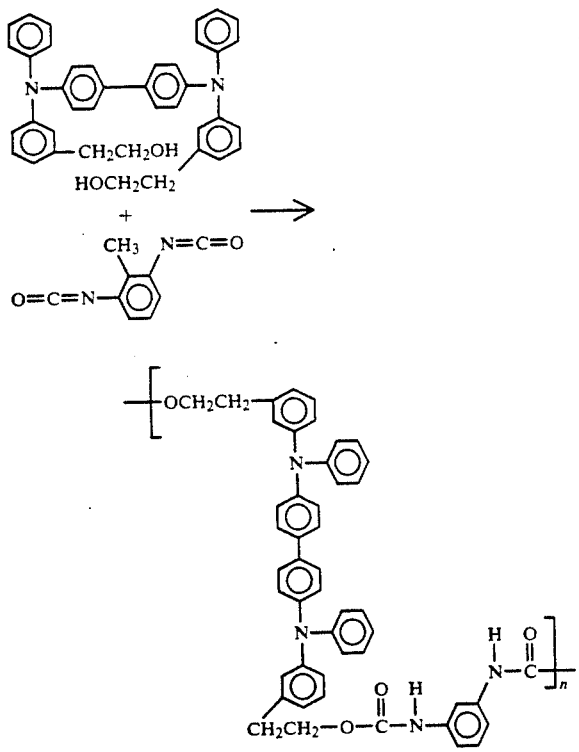

The following is an illustrative reaction between a preferred specific diisocyanate compound and a specific dihydroxy arylamine compound:

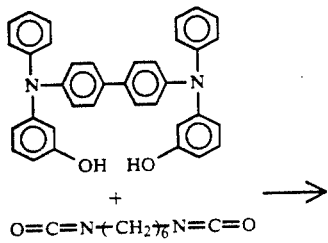

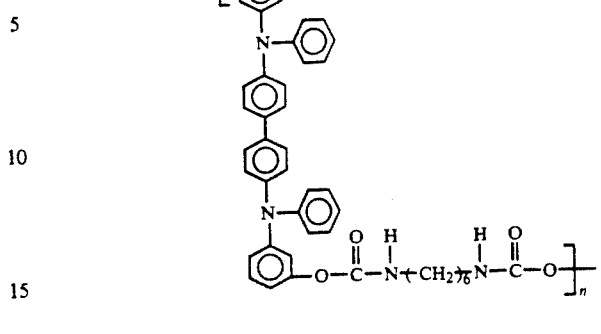

wherein the value of n was between about 40 and about 100. This polymer formed a viscous solution in tetrahydrofuran at a 10 percent by weight polymer concentration thereby further indicating that the material was a high molecular weight condensation polymer. The following is an illustrative reaction between a preferred specific diisocyanate compound and a specific dihydroxy group terminated low molecular weight polymer:

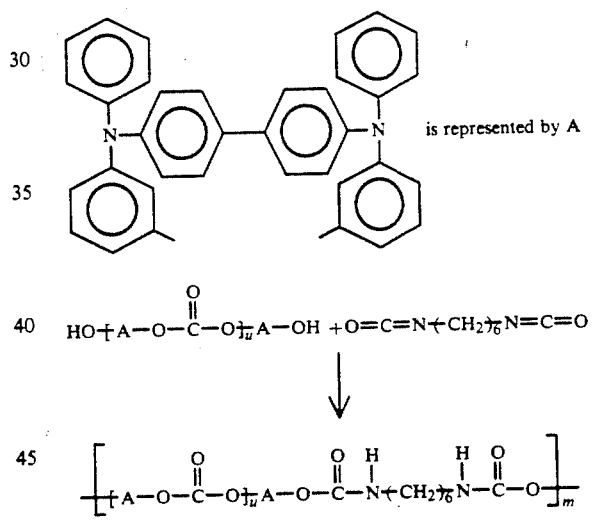

wherein the value of u was between about 10 and about 20 and the value of m was between about 10 and about 50. The polymer formed by coupling the dihydroxy group terminated low molecular weight polymer with the diisocyanate formed a viscous solution in tetrahydrofuran at a 10 percent by weight polymer concentration thereby further indicating that the material was of a higher molecular weight.

Multilayered photoconductive devices were fabricated with these polymers by applying methylene chloride solutions of the polymers to aluminum substrates bearing a 0.5 micrometer thick vapor deposited amorphous selenium layer. The deposited charge transport layers were then dried to a 15 micrometer thickness. These photoconductors were corona charged to a negative potential and thereafter discharged with a monochromatic light source of 4330 A wavelength. These photoreceptor devices exhibited low dark decay, high mobility and low residual charge.

The arylamine transporting moieties of the polymers of this invention are rather rigid units, e.g. tetraphenylbenzidine, triphenylamine and they like. When incorporated in polymeric structures, this unit can be considered a rigid-rod unit (RRU). In condensation polymers, rigid-rod structures result in polymers of impaired flexibility, reduced adhesion and a tendency to crack. Counterbalancing this in part is the cohesiveness inherent in most condensation polymers due to the presence of dipoledipole interaction (in this case the dipole associated with the carbonyl unit). Additionally, the urethane linkages of these polymeric structures are capable of forming interchain hydrogen bonds which further enhance the cohesiveness of these polymeric materials. The class of polymers in this invention possesses a flexible unit (FLU) to reduce the brittleness and improve other mechanical properties of the resultant polymer. The flexible units (FLU) in the charge transporting polymers of this invention are derived from the diisocyanate compound represented by the generic formula above. In diisocyanato ethane, diethylene glycol diisocyanate, triethylene glycol diisocyanate and trans-1,4-cyclohexylene diisocyanate-1,6-hexane, the presence of ether units and/or methylene units impart a substantial degree of flexibility because it possesses minimal hinderance to bond rotation. Additionally, the presence of urethane linkages enhances flexibility of all polyurethanes regardless of the structure of the diisocyanate from which they are derived. Generally, for those applications in which greater flexibility is required, polymers derived from diisocyanates containing ether units and/or methylene units are preferred whereas for those applications in which greater hardness or creep resistance is required, polymers derived from diisocyanates containing aromatic rings and/or double bond units are preferred. Thus, it is possible to tailor the physical properties to the intended use.

The following structures illustrate and compare polyurethane structures derived from diisocyanates containing aromatic rings and/or double bond units with polyurethane structures derived from diisocyanates containing ether units and/or methylene units. The rigid-rod units (RRU) of the arylamine moiety are represented by rectangles and rigid units associated with specific diisocyanates are shown as crosshatched rectangles. The flexible units (FLU) derived from diisocyanates are shown as springs.

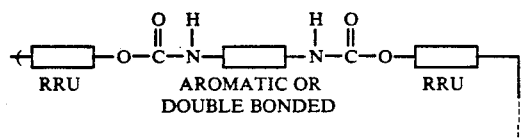

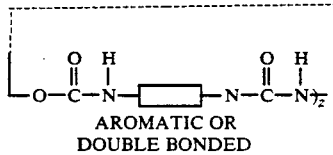

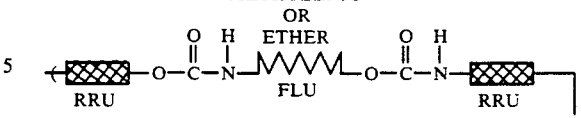

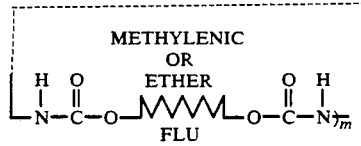

z and m are between about 5 and about 5,000. Thus, the flexible units (FLU) of the polymer of this invention reduce the brittleness and improve other mechanical properties such as tensile toughness whereas the modulus and hardness are increased with polymers derived from diisocyanates containing aromatic rings and/or double bonds compared to polymers having rigid rod units (RRU).

A photoconductive imaging member containing the polymeric arylamine of this invention may be prepared by providing a substrate having an electrically conductive surface, applying a charge blocking layer on the electrically conductive surface, applying a charge generation layer on the blocking layer and applying a charge transport layer on the charge generation layer. If desired, the charge transport layer may be applied to the electrically conductive surface and the charge generation layer may thereafter be applied to the charge transport layer. The polymeric arylamine of this invention is present in at least the charge generation layer or the charge transport layer. When the photoconductive imaging member is employed in liquid development systems, the polymeric arylamine of this invention is preferably present in at least the outermost layer of the imaging member.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like. The electrically insulating or conductive substrate may be rigid or flexible and may have any number of different configurations such as, for example, a cylinder, sheet, a scroll, an endless flexible belt, and the like. Preferably, the substrate is in the form of an endless flexible belt and comprises a commercially available biaxially oriented polyester known as Mylar, available from E.I. du Pont de Nemours & Co. or Melinex available from ICI.

The thickness of the substrate layer depends on numerous factors, including economical considerations, and thus a layer for a flexible belt may be of substantial thickness, for example, over 200 micrometers, or of minimum thickness less than 50 micrometers, provided there are no adverse affects on the final photoconductive device. In one flexible belt embodiment, the thickness of this layer ranges from about 65 micrometers to about 150 micrometers, and preferably from about 75 micrometers to about 125 micrometers for optimum flexibility and minimum stretch when cycled around small diameter rollers, e.g. 12 millimeter diameter rollers. The surface of the substrate layer is preferably cleaned prior to coating to promote greater adhesion of the deposited coating. Cleaning may be effected by exposing the surface of the substrate layer to plasma discharge, ion bombardment and the like.

The conductive layer may vary in thickness over substantially wide ranges depending on the optical transparency and flexibility desired for the electrophotoconductive member. Accordingly, when a flexible photoresponsive imaging device is desired, the thickness of the conductive layer may be between about 20 angstrom units to about 750 angstrom units, and more preferably from about 50 Angstrom units to about 200 angstrom units for an optimum combination of electrical conductivity, flexibility and light transmission. The conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. If desired, an alloy of suitable metals may be deposited. Typical metal alloys may contain two or more metals such as zirconium, niobium, tantalum, vanadium and hafnium, titanium, nickel, stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer.

After deposition of the metal layer, a hole blocking layer may be applied thereto. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl) isostearoyl titanate, isopropyl tri(N-ethylaminoethylamino) titanate, isopropyl trianthranil titanate, isopropyl tri(N,N-dimethylethylamino) titanate, titanium-4-amino benzene sulfonat oxyacetate, titanium 4-aminobenzoate isostearate oxyacetate, [H$_2$N(CH$_2$)$_4$]CH$_3$Si(OCH$_3$)$_2$, (gamma-aminobutyl) methyl diethoxysilane, and [H$_2$N(CH$_2$)$_3$]CH$_3$Si(OCH$_3$)$_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The oxidized surface inherently forms on the outer surface of most metal ground plane layers when exposed to air after deposition. This combination enhances electrical stability at low RH. The hydrolyzed silane has the general formula:

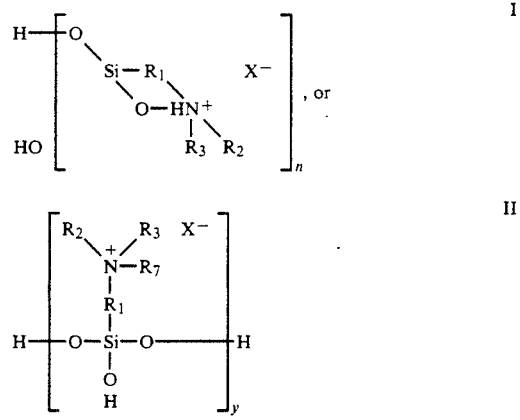

or mixtures thereof, wherein R$_1$ is an alkylidene group containing 1 to 20 carbon atoms, R$_2$, R$_3$ and R$_7$ are independently selected from the group consisting of H, a lower alkyl group containing 1 to 3 carbon atoms and a phenyl group, X is an anion of an acid or acidic salt, n is 1, 2, 3 or 4, and y is 1, 2, 3 or 4.

The imaging member is preferably prepared by depositing on the metal oxide layer of a metal conductive anode layer, a coating of an aqueous solution of the hydrolyzed aminosilane at a pH between about 4 and about 10, drying the reaction product layer to form a siloxane film and applying an adhesive layer of this invention, and thereafter applying electrically operative layers, such as a photogenerator layer and a hole transport layer, to the siloxane film.

The blocking layer should be continuous and have a thickness of less than about 0.5 micrometer because greater thicknesses may lead to undesirably high residual voltage. A blocking layer of between about 0.005 micrometer and about 0.3 micrometer (50 Angstroms-3000 Angstroms) is preferred because charge neutralization after the exposure step is facilitated and optimum electrical performance is achieved. A thickness of between about 0.03 micrometer and about 0.06 micrometer is preferred for metal oxide layers for optimum electrical behavior. Optimum results are achieved with a siloxane blocking layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating. This siloxane coating is described in U.S. Pat. No. 4,464,450 to L. A. Teuscher, the disclosure of this patent being incorporated herein in its entirety.

If desired, any suitable adhesive layer may be applied to the hole blocking layer. Typical adhesive layers include a polyester resin such as Vitel PE-100, Vitel PE-200, Vitel PE-200D, and Vitel PE-222, all available from Goodyear Tire and Rubber Co., polyvinyl butyral, duPont 49,000 polyester, and the like. When an adhesive layer is employed, it should be continuous and preferably, has a dry thickness between about 200 angstroms and about 900 angstroms and more preferably between about 400 angstroms and about 700 angstroms. Any suitable solvent or solvent mixtures may be employed to form a coating solution of the adhesive layer material. Typical solvents include tetrahydrofuran, toluene, methylene, chloride, cyclohexanone, and the like, and mixtures thereof. Generally, to achieve a continuous adhesive layer thickness of about 900 angstroms or less by gravure coating techniques, the solids concentration are between about 2 percent and about 5 percent by weight based on the total weight of the coating mixture of resin and solvent. However, any other suitable and conventional technique may be utilized to mix and thereafter apply the adhesive layer coating mixture to the charge blocking layer. Typical application techniques include spraying, dip coating, roll coating, wire wound rod coating, and the like. Drying of the deposited coating may be effected by any suitable conventional technique such as oven drying, infra red radiation drying, air drying and the like.

Any suitable photogenerating layer may be applied to the blocking layer or intermediate layer if one is employed, which can then be overcoated with contiguous hole transport layer as described. Examples of photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigment such as the X-form of metal free phthalocyanine described in U.S. Pat. No. 3,357,989, metal phthalocyanines such as vanadyl phthalocyanine and copper phthalocyanine, quinacridones available from DuPont under the trade name Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Selenium, selenium alloy, benzimidazole perylene, and the like and mixtures thereof may be formed as a continuous, homogeneous photogenerating layer. Benzimidazole perylene compositions are well known and described, for example in U.S. Pat. No. 4,587,189, the entire disclosure thereof being incorporated herein by reference. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layer comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Numerous inactive resin materials may be employed in the photogenerating binder layer including those described, for example, in U.S. Pat. No. 3,121,006, the entire disclosure of which is incorporated herein by reference. Typical organic resinous binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amide-imide), styrene-butadiene copolymers, vinylidenechloride-vinylchloride copolymers, vinylacetate-vinylidenechloride copolymers, styrene-alkyd resins, and the like. These polymers may be block, random or alternating copolymers.

Active carrier transporting resin may also be employed as the binder in the photogenerating layer. These resins are particularly useful where the concentration of carrier generating pigment particles is low and the thickness of the carrier generation layer is substantially thicker than about 0.7 micrometer. The active resin commonly used as a binder is polyvinylcarbazole whose function is to transport carriers which would otherwise be trapped in the layer.

The electrically active polymeric amines of this invention can be employed in the generation layer replacing the polyvinylcarbazole binder or any other active or inactive binder.

Part or all of the active resin materials to be employed in the generator layer may be replaced by the electrically active polymeric arylamines of this invention.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

For embodiments in which the photogenerating layers do not contain a resinous binder, the photogenerating layer may comprise any suitable, well known homogeneous photogenerating material. Typical homogeneous photogenerating materials include inorganic photoconductive compounds such as amorphous selenium, selenium alloys selected such as selenium-tellurium, selenium-tellurium-arsenic, and selenium arsenide and organic materials such as vanadyl phthalocyanine, chlorindium phthalocyanine.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer comprises a polymeric aryl amine of this invention capable of supporting the injection of photogenerated holes from the charge generation layer and allowing the transport of these holes through the transport layer to selectively discharge the surface charge. When the photogenerating layer is sandwiched between the conductive layer and the active charge transport layer, the transport layer not only serves to transport holes, but also protects the photoconductive layer from abrasion or chemical attack and therefore extends the operating life of the electrophotographic imaging member. The charge transport layer should exhibit negligible, if any, discharge when exposed to a wavelength of light useful in xerography, e.g. 4000 angstroms to 9000 angstroms. Therefore, the charge transport layer is substantially transparent to radiation in a region in which the photoconductor is to be used. Thus, the active charge transport layer is a substantially nonphotoconductive material which supports the injection of photogenerated holes from the generation layer. The active transport layer is normally transparent when exposure is effected through the active layer to ensure that most of the incident radiation is utilized by the underlying charge carrier generator layer for efficient photogeneration. When used with a transparent substrate, imagewise exposure may be accomplished through the substrate with all light passing through the substrate. In this case, the active transport material need not be transmitting in the wavelength region of use. The charge transport layer in conjunction with the generation layer in the instant invention is a material which is an insulator to the extent that an electrostatic charge placed on the transport layer is not conducted in the absence of illumination.

Part or all of the transport material comprising a hole transporting small molecule in an inactive binder to be employed in the transport layer may be replaced by the active materials of this invention described above comprising a polymeric arylamine film forming material. Any substituents in the polymeric arylamine compound should be free from electron withdrawing groups such as $NO_2$ groups, CN groups, and the like. The hole transporting small molecule-inactive resin binder composition may be entirely replaced with 100 percent of a polymeric arylamine compound of this invention.

Any suitable solvent may be employed to apply the transport layer material to the underlying layer. Typical solvents include methylene chloride, toluene, tetrahydrofuran, and the like. The selection of the solvent is determined in part by the coating method and the solvent characteristics of the other functional layers in the photoresponsive device. Methylene chloride solvent is a particularly desirable component of the charge transport layer coating mixture for adequate dissolution of all the components and for its low boiling point.

Any suitable and conventional technique may be utilized to mix and thereafter apply the charge transport layer coating mixture to the underlying surface, e.g. charge generating layer. Typical application techniques include spraying, dip coating, roll coating, wire wound rod coating, and the like. Drying of the deposited coating may be effected by any suitable conventional technique such as oven drying, infra-red radiation drying, air drying and the like.

Generally, the thickness of the hole transport layer is between about 5 to about 100 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Other layers such as conventional ground strips comprising, for example, conductive particles dispersed in a film forming binder may be applied to one edge of the photoreceptor in contact with the conductive surface, blocking layer, adhesive layer or charge generating layer.

Optionally, an overcoat layer may also be utilized to improve resistance to abrasion. In some cases a back coating may be applied to the side opposite the photoreceptor to provide flatness and/or abrasion resistance. These overcoating and backcoating layers may comprise organic polymers or inorganic polymers that are electrically insulating or slightly semi-conductive.

An electrophotographic member containing the electrically active polymeric arylamine of the present invention in at least the generator or transport layer may be employed in any suitable and conventional electrophotographic imaging process which utilizes charging prior to imagewise exposure to activating electromagnetic radiation. Conventional positive or reversal development techniques may be employed to form a marking material image on the imaging surface of the electrophotographic imaging member. Thus, by applying a suitable electrical bias and selecting toner having the appropriate polarity of electrical charge, one may form a toner image in the negatively charged areas or discharged areas on the imaging surface of the electrophotographic member. More specifically, for positive development, charged toner particles of one polarity are attracted to the oppositely charged electrostatic areas of the imaging surface and for reversal development, charged toner particles are attracted to the discharged areas of the imaging surface. Where the transport layer of this invention is sandwiched between a photogenerating layer and a conductive surface, a positive polarity charge is normally applied prior to imagewise exposure to activating electromagnetic radiation. Where the photogenerating layer is sandwiched between a transport layer and a conductive surface, a negative polarity charge is normally applied prior to imagewise exposure to activating electromagnetic radiation. As is well known in the art, the conductive layer may be omitted and the opposite sides of the generator and transport layer assembly may be simultaneously charged with charges of opposite polarity to achieve the equivalent effect of a conductive layer.

The polymeric arylamine of the present invention exhibits greater resistance to cracking, crazing, crystallization of arylamine compounds, phase separation of arylamine compounds and leaching of arylamine compounds during cycling if exposed to a xerographic liquid developer.

The invention will now be described in detail with respect to the specific preferred embodiments thereof, it being understood that these examples are intended to be illustrative only and that the invention is not intended to be limited to the materials, conditions, process parameters and the like recited herein. All parts and percentages are by weight unless otherwise indicated.

EXAMPLE I

Into a 100 milliliter three-necked round bottom flask equipped with a mechanical stirrer, an argon gas inlet fitted to the top of a pressure equalizing addition funnel and a rubber syringe septum was placed 5.2 grams N,N'-diphenyl-N,N'-bis-(3-hydroxyphenyl)-[1,1'-biphenyl]-4,4'diamine (0.01 mole), prepared following the procedure of Example II in U.S. Pat. No. 4,806,443, 10 milliliters of dry toluene and 0.017 gram of DABCO (diazabicyclooctane) dissolved in 6 milliliters of dry toluene. The temperature of the reaction mixture was allowed to rise to 70° C. 1.6 Milliliters (1.68 grams 0.01 mole) of 1,6-diisocyanatohexane was introduced to the reaction mixture using a syringe via the rubber septum. After 12 hours a white solid separated from the other contents of the reaction flask. A mixture of 25 milliliters of tetrahydrofuran and 10 milliliters of N-methyl pyrrolidone were added to dissolve the solid and then the reaction mixture temperature was maintained an additional 96 hours. A small sample of the viscous reaction mixture was withdrawn from the reaction flask and added to methanol causing a precipitate to form. An infrared spectrum of this material did not reveal a band at 4.5 micrometers. The colorless polymer solution was precipitated into 700 milliliters of methanol, filtered and dried. The white solid was taken up in tetrahydrofuran and reprecipitated by methanol. Yield 5 grams. Mw 28,000. This Example illustrates an embodiment where dihydroxyarylamines are joined with urethane linkages.

EXAMPLE II

Into a 500 milliliter three-necked round bottom flask equipped with a mechanical stirrer, an argon gas inlet and a dropping funnel was placed 26 grams N,N'-diphenyl N,N'-bis-(3-hydroxy phenyl)-[1,1' biphenyl]-4,4'-diamine (0.05 mole), 100 milliliters dry methylene chloride, and 12 milliliters pyridine (0.15 mole). The contents of the reaction flask were cooled with a water bath while adding dropwise 5.1 grams of phosgene (0.15 mole) dissolved in 40 milliliters of dry methylene chloride. A colorless precipitate of pyridine hydrochloride was formed after about half of the phosgene solution had been added. After the addition was complete and the viscous mixture was diluted with 200 milliliters of methylene chloride and precipitated by 1500 milliliters of methanol containing traces of water. The colorless polymer isolated by filtration and dried and then redissolved in methylene chloride and precipitated into methanol, filtered and dried. Yield 26 grams. Mw 5,740. Infrared and nuclear magnetic resonance end group analysis show the resultant oligomeric material to be phenolic group terminated. This Example illustrates the preparation of a OH-terminated polyarylamine.

EXAMPLE III

Into a 250 milliliter three-necked round bottom flask equipped with a mechanical stirrer, an argon gas inlet and a rubber syringe septum was placed 10.1 grams of the oligomeric product isolated from the reaction described in Example II, 25 milliliters dry toluene, and 0.336 gram of 1.6-diisocyanatohexane and 0.003 gram of DABCO (diazabicyclooctane). The contents of the flask were stirred and heated at 70° C. for 4 days during which time the viscosity of the solution steadily increased. The polymer was precipitated by methanol and dried. Mw 47,000. This Example illustrates an embodiment where polyarylamines (OH-terminated) are joined with urethane linkages.

EXAMPLE IV

Into a 250 milliliter three-necked round bottom flask equipped with a mechanical stirrer, an argon gas inlet tube and a stopper was placed 15.6 grams N,N'-diphenyl-N,N'bis-(3-hydroxyphenyl)-[1,1'-biphenyl]-4,4'-diamine, 0.03 mole, 45 milliliters of toluene, 0.2 gram dibutyltin dilaurylate and 0.016 gram DABCO (diazabicyclooctane). A temperature regulated oil bath was used to maintain the temperature of the reaction mixture at 50° C. 1,6-diisocyanatohexane, 2.4 milliliters, 0.015 mole, was added. After stirring for 0.5 hour 3.5 milliliters of N-methylpyrrolidone was added. The progress of the reaction was monitored by following the decrease in isocyanate bond infrared absorption at 4.5 microns.

After 12 hours, 2.41 milliliters tolylene 2,4-diisocyanate, 0.017 mole, was added. The mixture was allowed to react an additional 12 hours. The copolymer was precipitated by pouring into methanol and the solids collected by filtration and dried. The copolymer was redissolved in tetrahydrofuran and reprecipitated by pouring into methanol. Yield 15 grams.

EXAMPLE V

A photosensitive member having a conductive layer, barrier layer, generation layer, and transport layer are prepared. An epoxy phenolic barrier layer about 0.5 micrometer thick is formed on a 3 mil aluminum substrate by dip coating. A 1 micrometer layer of amorphous selenium is then vacuum evaporated on the coated aluminum substrate by a conventional vacuum deposition technique such as the technique disclosed in Bixby in U.S. Pat. Nos. 2,753,278 and 2,970,906. More specifically, vacuum deposition is carried out at a vacuum of $10^{-6}$ Torr while the substrate is maintained at a temperature of about 50° C. during the vacuum deposition. A charge transport layer is prepared by dissolving 1.5 grams of polymer, from Example I, in 7.5 milliliters of tetrahydrofuran. A layer of this mixture is formed on amorphous selenium layer using a Bird film applicator.

The coating is then vacuum dried at 40° C. for 18 hours to form a 22 micrometer thick dry layer of the charge transport material. The plate is tested for its photoconductive property by first negatively corona charging to a field of 50 volts/micron and exposing to a blue light flash of 4330 A° wavelength, 2 microseconds duration and 25 ergs/cm$^2$ light intensity. The device discharges to a very low potential of less than 50 volts indicating good photoconductive properties.

EXAMPLE VI

A charge transport layer is prepared by dissolving 10 milliliters of cyclohexanone and 1.5 grams of the polymer from Example III. A layer of this mixture is formed on a 0.2 micrometer As$_2$Se$_3$ layer deposited on an aluminum substrate, using a Bird film applicator. The coating is then vacuum dried at 100° C. for one hour to form a 22 micrometer thick dry layer of the charge transport material. The plate is tested for its photoconductive property by first negatively corona charging to a field of 50 volts/micrometer and exposing to a blue light flash of 4330 A° wavelength, 2 microseconds duration, and 25 ergs/cm$^2$ light intensity. The device discharged to a very low potential of less than 50 volts indicating good photoconductive properties. The member is then subjected to a cyclic operation of charge-expose and erase cycles in a scanner, and is found to be stable even after 20,000 cycles of essentially continuous operation.

EXAMPLE VII

A charge transport layer is prepared by dissolving 10 milliliters of cyclohexanone and 1.5 grams of the polymer from Example IV. A layer of this mixture is formed on a 0.2 micrometer thick As$_2$Se$_3$ layer deposited on an aluminum substrate, using a Bird film applicator. The coating is then vacuum dried at 100° C. for one hour to form a 22 micrometer thick dry layer of the charge transport material. The plate is tested for its photoconductive property by first negatively corona charging to a field of 50 volts/micrometer and exposing to a blue light flash of 4330 A° wavelength, 2 microseconds duration, and 25 ergs/cm$^2$ light intensity. The device discharged to a very low potential of less than 50 volts indicating good photoconductive properties. The member is then subjected to a cyclic operation of charge-expose and erase cycles in a scanner, and is found to be stable even after 20,000 cycles of essentially continuous operation.

EXAMPLE VIII

The polymerization was conducted under argon, in dry glassware. 2.10655 grams N,N'-diphenyl-N,N'bis-(3-(2-hydroxyethyl)-phenyl)-[1,1'-biphenyl]-4,4'-diamine (3.652 mmole), prepared following the procedures of in U.S. Pat. No. 4,801,517, was dissolved in about 15 ml of dry chlorobenzene in a three-neck flask, 5-10 drops of triethylamine were added and the solution heated to reflux. In an addition funnel, 1,4-phenylene diisocyanate (0.58486 gram, 3.652 mmole) was dissolved in about 15 ml of dry chlorobenzene and slowly added to the refluxing diol solution. The mixture was refluxed overnight. Without cooling, 10 to 15 ml of the solvent was removed from the mixture by distillation. The polymer was isolated by dropwise addition of the hot polymerization mixture to 4 liters of rapidly stirred methanol. Yield: 1.7 grams; 65%; Tg=150° C.

EXAMPLE IX

The xerographic electrical properties of the polymer of Example VIII were obtained by casting a film (nominally 20 micrometers) on a thin evaporated film of an evaporated amorphous selenium photogenerator (0.5 micrometer) layer on aluminum substrate samples. A solution of the hole transport polymer (15 percent by weight solids in tetrahydrofuran) was cast onto the selenium layer using a drawbar (10 mils gap). The coated films were dried in a forced air oven at 40° C. for 60 minutes in a forced air oven. The thickness of the dried charge transport layer was about 20 micrometers. The resulting dual layer photoreceptor devices were charged negatively and then photodischarged using a monochromatic light of 450 nm or white light of 400-700 nm. The devices exhibited high charge acceptance, steep photoinduced discharge curve (PIDC) characteristics, high charge carrier mobility and low residual potential. Xerographic cycling data (1000 cycles) indicated good cyclic stability. The charge transport layer possessed good film quality with no cracks or delamination after repeated xerographic measurements. The film was stored under ambient conditions for approximately 8 months without any degradation in physical or electrical properties.

EXAMPLE X

The polymerization of N,N'-diphenyl-N,N'bis-(3-(2-hydroxyethyl)-phenyl)-[1,1'-biphenyl]-4,4'-diamine was carried out following the procedure described in EXAMPLE VIII except that 2,6-tolylene diisocyanate was used instead of the 1,4-phenylene diisocyanate. Yield: 1.7 grams; 81%;
Tg=135° C.

EXAMPLE XI

The xerographic electrical properties of the polymer of Example X were obtained by casting a film (nominally 20 micrometers) on a thin evaporated film of an evaporated amorphous selenium photogenerator (0.5 micrometer) layer on aluminum substrate samples. A solution of the hole transport polymer (16 percent by weight solids in dichloromethane) was cast onto the selenium layer using a drawbar (10 mils gap). The coated films were dried at 40° C. for 60 minutes in a forced air oven. The thickness of the dried charge transport layer was about 20 micrometers. The resulting dual layer photoreceptor devices were charged negatively and then photodischarged using a monochromatic light of 450 nm or white light of 400-700 nm. The devices exhibited high charge acceptance, good photoinduced discharge curve (PIDC) characteristics.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A polyarylamine polymer represented by formula:

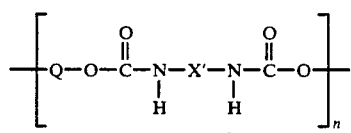

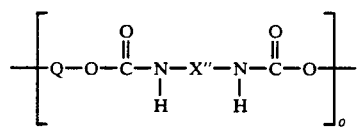

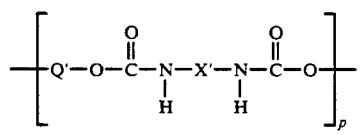

wherein:
n is between about 5 and about 5,000, or 0 if p>0,
o is between about 0 and about 5,000, or is 0 if p>0 or n=0,
p is between about 2 and about 100, or is 0 if n>0,
X' and X" are independently selected from a group having bifunctional linkages,
Q is a divalent group derived from a hydroxy terminated arylamine reactant containing the group:

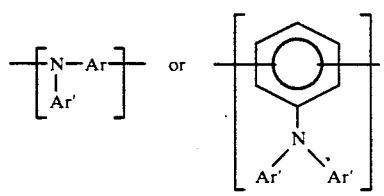

Q' is a divalent group derived from a hydroxy terminated polyarylamine containing the group defined for Q and having a weight average molecular weight between about 1000 and about 80,000,
wherein:
Ar is selected from the group consisting of:

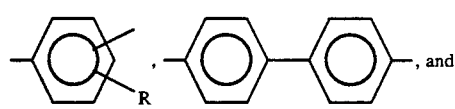

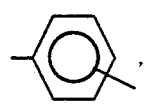

R is selected from the group consisting of —CH₃, —C₂H₅, —C₃H₇, and —C₄H₉,
Ar' is selected from the group consisting of:

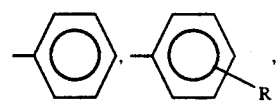

-continued

and the weight average molecular weight of the polyarylamine polymer is between about 10,000 and about 1,000,000.

2. A polyarylamine polymer according to claim 1 wherein said polyarylamine polymer is represented by the formula:

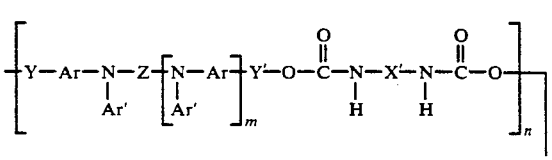

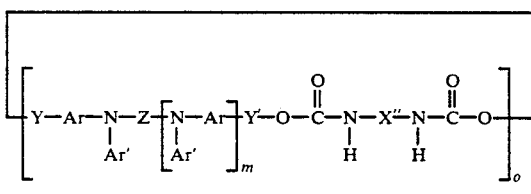

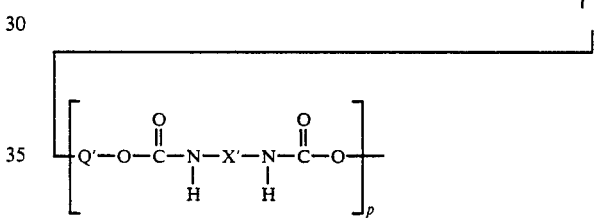

wherein:
m is 0 or 1,
n is between about 5 and about 5,000, or is 0 if p>0,
o is between about 0 and about 5,000, or is 0 if p>0 or n=0,
p if between about 2 and about 100, or is 0 if n>0,
Z is selected from the group consisting of:

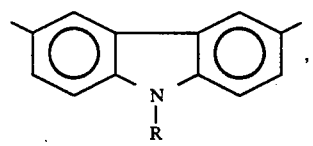

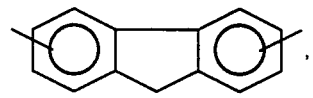

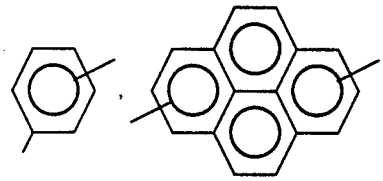

and

-continued

—Ar—(X)$_r$—Ar— r is 0 or 1,
Ar is selected from the group consisting of:

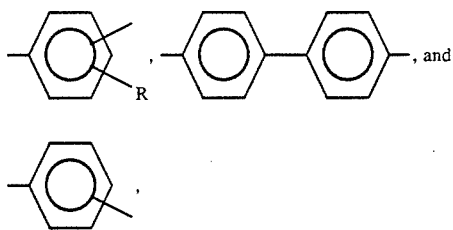

R is selected from the group consisting of —CH$_3$, —C$_2$H$_5$, —C$_3$H$_7$, and —C$_4$H$_9$,
Ar' is selected from the group consisting of:

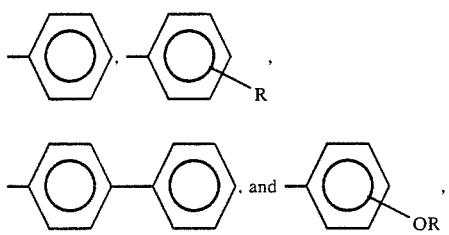

X is selected from the group consisting of:

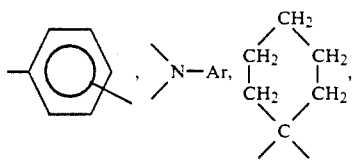

s is 0, 1 or 2,
X' and X" are independently selected from a group having bifunctional linkages, and
Y and Y' are independently selected from a group represented by the formula:

—(CH$_2$)$_t$— t is 0, 1, 2, 3, or 4
Q' is represented by the formula:

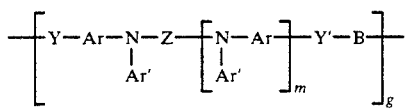

wherein:
Ar, Ar', Z, Y, Y', and m, are as defined previously, and B represents a bifunctional linkage, g is between about 2 and about 350 such that the weight average molecular weight of Q' is between about 1000 and about 80,000,
and the weight average molecular weight of said polyarylamine polymer is between about 20,000 and about 500,000.

3. A polyarylamine polymer according to claim 1 wherein said polyarylamine polymer is the reaction product of a dihydroxy arylamine compound and a co-reactant diisocyanate compound represented by the formula:

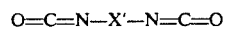

wherein X' is a bifunctional linkage containing from 1 to 25 carbon atoms.

4. A polyarylamine polymer according to claim 3 wherein an additional diisocyanate compound is included in said reaction, said additional diisocyanate compound being represented by the formula:

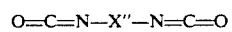

wherein X" is a bifunctional linkage containing from 1 to 25 carbon atoms.

5. A polyarylamine polymer according to claim 1 wherein said polyarylamine polymer is the reaction product of a dihydroxy arylamine compound represented by the formula:

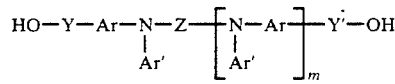

wherein:
m is 0 or 1,
n is between about 5 and about 5,000, or is 0 if p>0,
o is between about 0 and about 5,000, or is 0 if p>0 or n=0,
p if between about 2 and about 100, or is 0 if n>0,
Z is selected from the group consisting of:

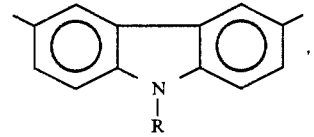

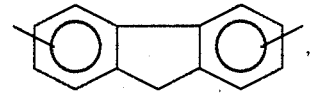

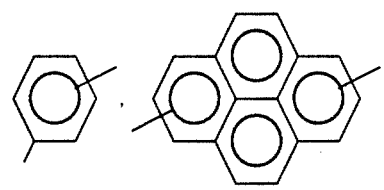

and

—Ar—(X)$_r$—Ar— r is 0 or 1,
Ar is selected from the group consisting of:

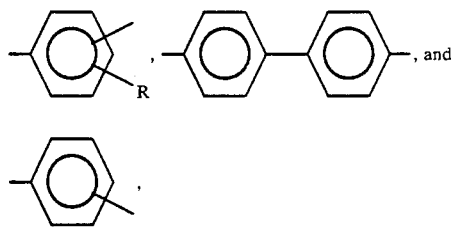, and

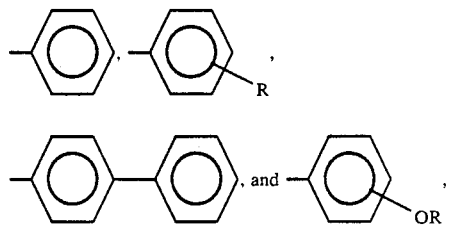,

R is selected from the group consisting of —CH$_3$, —C$_2$H$_5$, —C$_3$H$_7$, and —C$_4$H$_9$, Ar' is selected from the group consisting of:

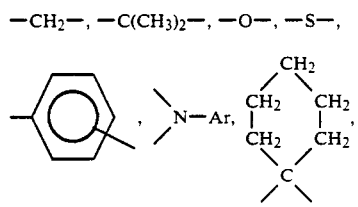,

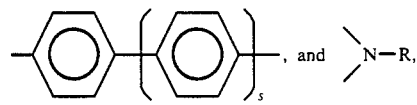,

X is selected from the group consisting of:

—CH$_2$—, —C(CH$_3$)$_2$—, —O—, —S—,

s is 0, 1 or 2,

X' AND X'' are independently selected from a group having bifunctional linkages, and Y and Y' are independently selected from a group represented by the formula:

—(CH$_2$)$_t$— t is 0, 1, 2, 3, or 4.

6. A polyarylamine polymer according to claim 1 wherein said polyarylamine polymer is the reaction product of a diisocyanate with a low molecular weight hydroxy group terminated arylamine polymer represented by the generic formula:

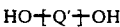

wherein:
Q' is a divalent group derived from a dihydroxy terminated polyarylamine material containing the following group:

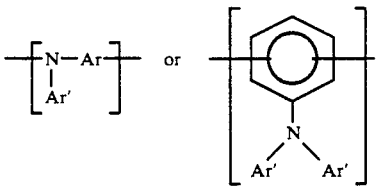

wherein:
Ar is selected from the group consisting of:

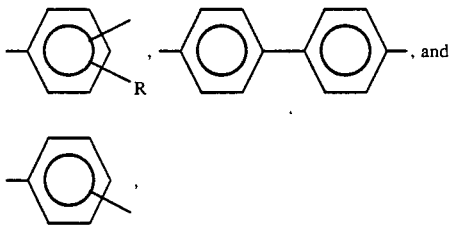

R is selected from the group consisting of —CH$_3$, —C$_2$H$_5$, —C$_3$H$_7$, and —C$_4$H$_9$, and Ar' is selected from the group consisting of:

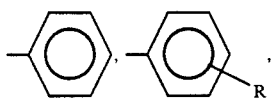

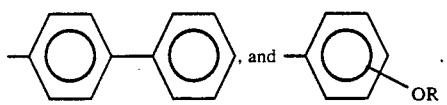

7. A polyarylamine polymer according to claim 6 wherein said low molecular weight hydroxy group terminated arylamine polymer has a weight average molecular weight between about 1,000 and about 80,000.

* * * * *